ized Patent

(12) United States Patent
Takahashi

(10) Patent No.: US 10,473,065 B2
(45) Date of Patent: Nov. 12, 2019

(54) FUEL RETURN DEVICE

(71) Applicant: Kyosan Denki Co., Ltd., Koga, Ibaraki-pref. (JP)

(72) Inventor: Tetsuya Takahashi, Koga (JP)

(73) Assignee: KYOSAN DENKI CO., LTD., Koga, Ibaraki-pref. (JP)

( * ) Notice: Subject to any disclaimer, the term of this patent is extended or adjusted under 35 U.S.C. 154(b) by 0 days.

(21) Appl. No.: 16/062,121

(22) PCT Filed: Nov. 25, 2016

(86) PCT No.: PCT/JP2016/084874
§ 371 (c)(1),
(2) Date: Jun. 14, 2018

(87) PCT Pub. No.: WO2017/104377
PCT Pub. Date: Jun. 22, 2017

(65) Prior Publication Data
US 2018/0372035 A1    Dec. 27, 2018

(30) Foreign Application Priority Data

Dec. 17, 2015  (JP) ................................ 2015-246452

(51) Int. Cl.
*F02M 33/08* (2006.01)
*F02M 25/08* (2006.01)
*F02M 37/00* (2006.01)
*B60K 15/035* (2006.01)
*B60K 15/04* (2006.01)

(52) U.S. Cl.
CPC ........... *F02M 33/08* (2013.01); *B60K 15/035* (2013.01); *B60K 15/04* (2013.01); *F02M 25/0836* (2013.01); *F02M 37/0029* (2013.01); *F02M 25/0854* (2013.01)

(58) Field of Classification Search
CPC ............... F02M 33/08; F02M 25/0836; F02M 25/0029; F02M 25/0854; B60K 15/035; B60K 15/04
See application file for complete search history.

(56) References Cited

U.S. PATENT DOCUMENTS 7,971,574 B2 *  7/2011  Kondoh ............. F02M 37/0052
                                                        123/457
2002/0150514 A1   10/2002  Haskew

FOREIGN PATENT DOCUMENTS

| JP | H10238419 A | 9/1998 |
| JP | H11247730 A | 9/1999 |
| JP | 2003035214 A | 2/2003 |
| JP | 2004534170 A | 11/2004 |
| JP | 2007224871 A | 9/2007 |

(Continued)

*Primary Examiner* — Hieu T Vo
(74) *Attorney, Agent, or Firm* — Harness, Dickey & Pierce, P.L.C.

(57) ABSTRACT

A fuel return device includes a fuel collector and a return system. The fuel collector is located in a passage between a fuel tank and a vapor fuel processing device that processes vapor fuel discharged from the fuel tank. The fuel collector collects the fuel and stores the collected fuel as a storage fuel. The return system extends from the fuel collector, and is connected to a low-pressure generation part that generates a low pressure by a flow of fuel refueled through a filler pipe into the fuel tank, to return the storage fuel to the fuel tank.

7 Claims, 2 Drawing Sheets

(56) References Cited

FOREIGN PATENT DOCUMENTS

| JP | 2008132989 A | 6/2008 |
|----|--------------|--------|
| JP | 2010059826 A | 3/2010 |

* cited by examiner

FUEL RETURN DEVICE

CROSS REFERENCE TO RELATED APPLICATIONS

This application is a U.S. National Phase Application under 35 U.S.C. 371 of International Application No. PCT/JP2016/084874 filed on Nov. 25, 2016 and published in Japanese as WO 2017/104377 A1 on Jun. 22, 2017. This application is based on and claims the benefit of priority from Japanese Patent Application No. 2015-246452 filed on Dec. 17, 2015. The entire disclosures of all of the above applications are incorporated herein by reference.

TECHNICAL FIELD

The present disclosure relates to a fuel return device.

BACKGROUND ART

Patent Literature 1 and Patent Literature 2 disclose a fuel tank system which controls discharge of vapor fuel from a fuel tank. Patent Literature 1 discloses a control valve which controls discharge of air from a fuel tank when liquid fuel is refueled. Furthermore, Patent Literature 1 discloses a jet pump for returning fuel caught by the control valve to the fuel tank.

PRIOR ART LITERATURES

Patent Literature

Patent Literature 1: JP 2010-59826 A
Patent Literature 2: JP 2008-132989 A

SUMMARY OF INVENTION

In the conventional arts, it is necessary to actuate an electric pump for supplying fuel that is a source of power for the jet pump to return the fuel caught by the control valve to the fuel tank. The caught fuel cannot be returned to the fuel tank while the electric pump is stopped. In the above-described viewpoints, or other viewpoints which are not mentioned, a fuel return equipment and a fuel tank system are further to be improved.

It is an object of the present disclosure to provide a fuel return device which can return collected fuel to a fuel tank without being dependent on an electric pump.

It is another object of the present disclosure to provide a fuel return device which can return collected fuel to a fuel tank at a refueling time.

According to an aspect of the present disclosure, a fuel return device includes: a fuel collector located in a passage between a fuel tank and a vapor fuel processing device that processes vapor fuel discharged from the fuel tank, the fuel collector collecting fuel and storing the collected fuel as a storage fuel; and a return system extending from the fuel collector, the return system being connected to a low-pressure generation part that generates a low pressure by a flow of fuel refueled through a filler pipe into the fuel tank, to return the storage fuel to the fuel tank.

According to the disclosed fuel return device, the return system returns the storage fuel stored out of the fuel tank to the fuel tank. The return system returns the storage fuel to the fuel tank by the low pressure generated by the low-pressure generation part. The low-pressure generation part generates the low pressure by the flow of fuel refueled through the filler pipe into the fuel tank. Therefore, the storage fuel can be returned to the fuel tank, without being dependent on an electric pump. Further, the storage fuel can be returned to the fuel tank during the refueling period. Therefore, the fuel collector can continuously collect and store fuel while fuel is contained in gas discharged from the fuel tank during the refueling period.

The present disclosure employs the following technical means, in order to attain the above-mentioned object. The symbols in the parenthesis indicated in claims merely show correspondence relations with concrete elements described in embodiments later mentioned as one example, and are not intended to limit the technical scope of this disclosure. The above and other objects, features and advantages of the present disclosure will become more apparent from the following detailed description made with reference to the accompanying drawings.

DESCRIPTION OF EMBODIMENTS

Figure 1:
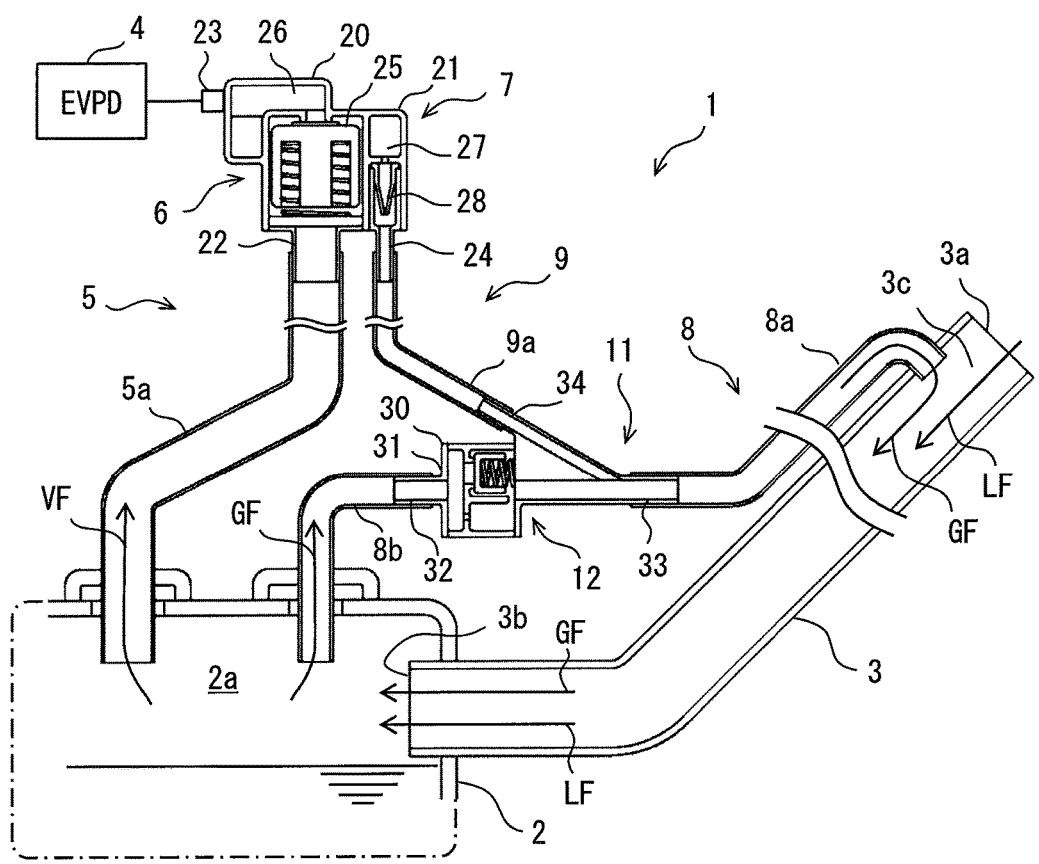
FIG. 1 is a block diagram of a fuel tank system according to an embodiment.

Embodiments of the present disclosure will be described hereafter referring to drawings. In the embodiments, portions functionally and/or structurally corresponding to each other, and/or related to each other may be assigned with the same reference numeral or reference numerals in which hundreds or more are different. The corresponding portion and/or the related portion can be referred to the explanation in the other embodiment.

Embodiment

In FIG. 1, a fuel tank system 1 is mounted in a conveyance such as vehicle or vessel. For example, the fuel tank system 1 is disposed in a vehicle that travels on a road. The fuel tank system 1 has a fuel tank 2 in which liquid fuel is stored. The liquid fuel evaporates at a temperature for which the fuel tank system 1 is usually used, and generates vapor fuel. The vapor fuel is mixed with air. The liquid fuel is, for example, gasoline or light oil. The fuel tank system 1 stores fuel to be supplied to a fuel consumption equipment such as internal combustion engine. The fuel tank system 1 has a filler pipe 3 for supplying fuel to the fuel tank 2. The filler pipe 3 extends upward from the fuel tank 2.

In many cases, in the following explanation, the liquid fuel is called just as fuel. In many cases, a gas mixture of vapor fuel and air is called just as vapor fuel. The words of "up" and "down" correspond to the gravity direction when the fuel tank 2 is in a regular installation state.

When fuel is refueled, the fuel is supplied from the inlet end 3a of the filler pipe 3. Fuel flows downward through the passage in the filler pipe 3, involving the surrounding gas such as air. Fuel arrives at the outlet end 3b of the filler pipe 3. Fuel is supplied into the fuel tank 2 from the outlet end 3b. In the drawing, a flow of fuel is represented by an arrow LF. In the drawing, a flow of vapor fuel is represented by an arrow GF.

The fuel tank 2 may have complicated form for loading to a vehicle. Furthermore, some components of the fuel tank system 1 may be located to separate from the fuel tank 2. Some components may be located at positions higher than the fuel tank 2.

The fuel tank system 1 has a vapor fuel processing unit (EVPD) 4. The vapor fuel processing unit 4 processes vapor fuel. The vapor fuel processing unit 4 is an equipment which controls the quantity of the vapor fuel emitted to the atmosphere from the fuel tank 2. The vapor fuel processing unit 4 has a canister including activated carbon which adsorbs vapor fuel. The vapor fuel processing unit 4 catches and accumulates the vapor fuel discharged from the fuel tank 2. Furthermore, the vapor fuel processing unit 4 includes a purge equipment which supplies the caught vapor fuel to a fuel consumption equipment for combusting the vapor fuel. An example of the purge equipment desorbs the vapor fuel from the activated carbon by supplying air to the activated carbon. Furthermore, the purge equipment mixes the desorbed vapor fuel to intake air of the internal combustion engine. The vapor fuel is processed by the internal combustion engine by combustion.

The fuel tank system 1 has an exhaust system 5. The exhaust system 5 is arranged between the fuel tank 2 and the vapor fuel processing unit 4. The exhaust system 5 supplies vapor fuel in the fuel tank 2 to the vapor fuel processing unit 4. The exhaust system 5 provides a passage for the exhaust gas from the fuel tank 2. For example, at a refueling time, the vapor fuel in the fuel tank 2 flows towards the vapor fuel processing unit 4 via the exhaust system 5, as shown by an arrow VF.

The exhaust system 5 has an upward extension pipe 5*a*. The upward extension pipe 5*a* is a piping extending upward from the fuel tank 2. The upward extension pipe 5*a* extends from the upper part 2*a* of the fuel tank 2 only by a predetermined height further upward. The end of the upward extension pipe 5*a* is open in the upper part 2*a*. The end of the upward extension pipe 5*a* is open at a location upper than the outlet end 3*b*. The upward extension pipe 5*a* can be understood as a part of the fuel tank 2.

The upward extension pipe 5*a* enables a valve mechanism 6 and a fuel collector 7, to be mentioned later, to be located to separate from the fuel tank 2. The upward extension pipe 5*a* enables the valve mechanism 6 and the fuel collector 7 to be positioned at a location higher than the end of the upward extension pipe 5*a*. Such an arrangement raises the flexibility for selecting the installation positions of the valve mechanism 6 and the fuel collector 7 in case where the top wall of the fuel tank 2 has non-flat shape. The other end of the upward extension pipe 5*a* is connected to the valve mechanism 6.

The exhaust system 5 has the valve mechanism 6. The valve mechanism 6 restricts leak of fuel via the exhaust system 5. The valve mechanism 6 is a valve which switches a passage of the exhaust system 5 from the open state to the closed state in response to the reaching of fuel, and/or a valve which switches the passage of the exhaust system 5 from the open state to the closed state when the inclination angle of the fuel tank 2 exceeds a predetermined angle. The valve mechanism 6 is also called as a fuel shutoff valve. The valve mechanism 6 may be offered, for example, by a valve called a rollover valve. In this case, the valve mechanism 6 is closed to stop leak of fuel when the inclination angle exceeds the predetermined angle, in case where the fuel tank 2 inclines from a regular posture. The valve mechanism 6 may be offered by a valve called a float valve. In this case, if fuel reaches the valve mechanism 6, the valve mechanism 6 is closed to restrict the leak of fuel. In the illustrated example, the valve mechanism 6 is a float valve.

The exhaust system 5 has the fuel collector 7. The fuel collector 7 provides a container storing fuel. The fuel collector 7 is located in a passage between the fuel tank 2 and the vapor fuel processing unit 4. The fuel collector 7 is located between the valve mechanism 6 and the vapor fuel processing unit 4. The fuel collector 7 is located immediately downstream of the valve mechanism 6. The fuel collector 7 catches fuel and stores the caught fuel. The fuel collector 7 is offered by a container located adjacent to the valve mechanism 6. The fuel collector 7 is formed to surround the radially outer side of the valve mechanism 6.

The fuel collector 7 is positioned to separate from the fuel tank 2. In the illustrated example, the fuel collector 7 is separated from the fuel tank 2 by the upward extension pipe 5*a*. In case where the upper wall of the fuel tank 2 has a large protrusion, the protrusion of the fuel tank 2 may reach near the fuel collector 7. Also in this case, it can be said that the fuel collector 7 is positioned to separate from the fuel tank 2, because the fuel collector 7 is separated from a connection part between the upward extension pipe 5*a* and the fuel tank 2. In other words, the fuel collector 7 is positioned upper than the connection part of the upward extension pipe 5*a* and the fuel tank 2.

The valve mechanism 6 and the fuel collector 7 are integrally formed as one-piece element. The valve mechanism 6 and the fuel collector 7 are provided by the collector unit 20. Within this configuration, the fuel collector 7 includes the valve mechanism 6. The collector unit 20 has a housing 21. The housing 21 is a product made of, for example, resin. The housing 21 has an inlet 22, an outlet 23, and a return outlet 24. The inlet 22 is connected to the upward extension pipe 5*a*. The inlet 22 introduces the fuel and the vapor fuel which are supplied from the fuel tank through the upward extension pipe 5*a* into the housing 21. The flow of fuel passing through the inlet 22 is shown by an arrow L1. The outlet 23 is connected to the vapor fuel processing unit 4. The outlet 23 supplies the vapor fuel from the housing 21 to the vapor fuel processing unit 4. The return outlet 24 is connected to the return system 9 to be mentioned later. The return outlet 24 supplies the storage fuel from the collector unit 20 to the return system 9.

Figure 2:
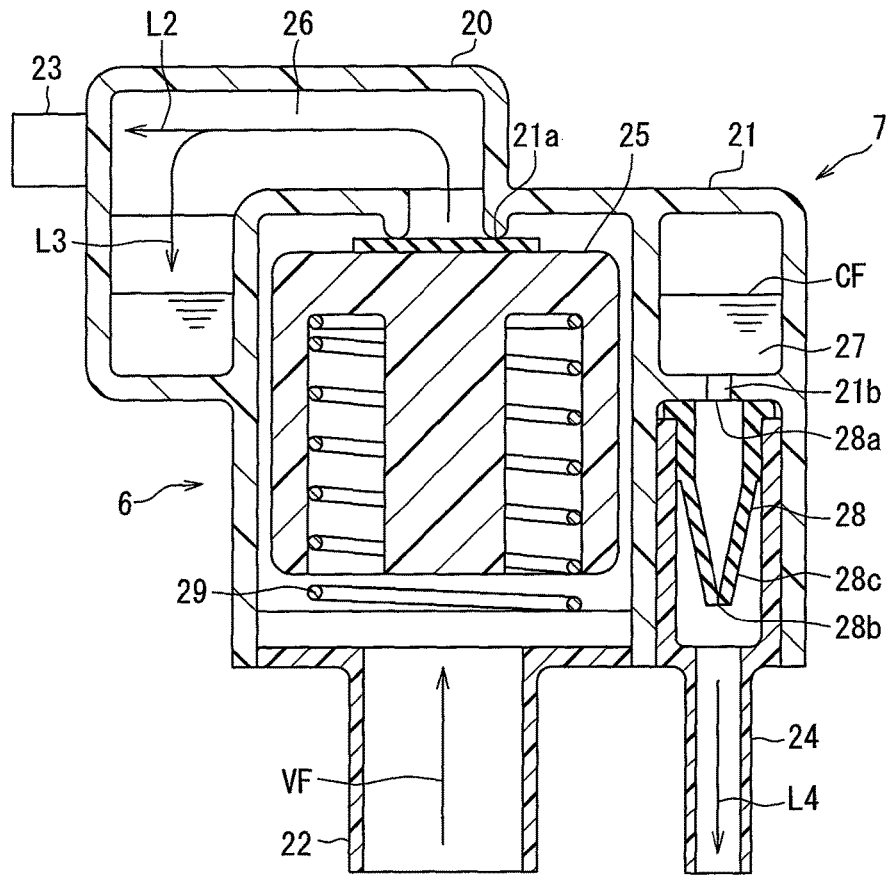
FIG. 2 is a sectional view of a collector unit of the embodiment.

In FIG. 1 and FIG. 2, the collector unit 20 is formed as one piping part which provides the valve mechanism 6 and the fuel collector 7. The collector unit 20 has a float valve 25 of the valve mechanism 6. The float valve 25 provides a movable valve object. The float valve 25 works with a fixed valve seat 21*a* formed in the housing 21, to switch the inlet 22 and the inside of the housing 21 to communicate with each other or be intercepted from each other. The valve closed state is illustrated in the drawing.

The collector unit 20 has a gas-liquid separation chamber 26. The gas-liquid separation chamber 26 is formed between the valve mechanism 6 and the outlet 23. The gas-liquid separation chamber 26 separates the fuel which passes through the valve mechanism 6 between the liquid fuel and the vapor fuel. The gas-liquid separation chamber 26 has a passage portion defined by the housing 21 and a barrier defined by the housing 21. The fuel which flows through the passage portion is separated between the liquid fuel and the vapor fuel by colliding with the barrier. The vapor fuel bypasses the barrier, and reaches the outlet 23. The flow of liquid fuel is shown by an arrow L2 in the drawing. The liquid fuel flows downward on the inner surface of the housing 21 by colliding with the barrier. The flow of liquid fuel is shown by an arrow L3 in the drawing. The gas-liquid separation chamber 26 may include plural barriers and/or plural barriers which define a zigzag passage.

The collector unit 20 has a storage chamber 27. The storage chamber 27 is arranged under the gas-liquid separation chamber 26. The storage chamber 27 stores the fuel separated in the gas-liquid separation chamber 26 as storage fuel. The storage chamber 27 annularly extends to surround the valve mechanism 6 including the float valve 25. The storage chamber 27 is formed as an annular container. An outlet hole 21b is formed in the bottom wall of the storage chamber 27, and the storage chamber 27 and the return outlet 24 are able to communicate with each other through the outlet hole 21b. The storage fuel can reach the return outlet 24 through the outlet hole 21b.

The gas-liquid separation chamber 26 and the storage chamber 27 form the fuel collector 7. The fuel collector 7 is formed to collect fuel between the valve mechanism 6 and the vapor fuel processing unit 4. FIG. 2 illustrates a liquid surface CF of the storage fuel.

The collector unit 20 has a check valve 28. The check valve 28 is disposed between the storage chamber 27 and the return outlet 24. The check valve 28 is a valve that responds to a pressure difference applied between the upstream and the downstream of the valve. The check valve 28 is a valve which responds to the weight of the storage fuel accumulated in the storage chamber 27. The check valve 28 is a duckbill valve having an inlet 28a adjacent to the fuel collector 7, and an outlet 28b adjacent to the circulation system 8 corresponding to a low-pressure generation part to be mentioned below. The duckbill valve has a cylindrical body 28c. The outlet 28b is a slit formed in the body 28c. The body 28c generates a biasing force so that the outlet 28b maintains the valve closed state. The outlet 28b is opened when a difference between a pressure which acts inside the body 28c and a pressure which acts outside the body 28c exceeds a predetermined valve-opening pressure difference.

The check valve 28 permits or forbids a flow of the storage fuel from the storage chamber 27 to the return system 9. The check valve 28 allows the storage fuel to flow from the storage chamber 27 to the return system 9, but prevents the fuel and the vapor fuel from flowing from the return system 9 to the storage chamber 27. The check valve 28 permits the fuel to flow to the fuel tank 2 through the return system 9 in the forward direction, and prevents the backward flow from the fuel tank 2 in the opposite direction. The check valve 28 opens when the pressure of the fuel collector 7 is higher than the pressure adjacent to the low-pressure generation part by a predetermined threshold pressure difference. The check valve 28 can be opened also by the weight of the storage fuel accumulated in the storage chamber 27. The check valve 28 is opened by the storage fuel stored in the storage chamber 27 when the amount of the storage fuel exceeds a predetermined quantity. Furthermore, the pressure difference makes the check valve 28 easy to open. Thus, the storage fuel stored in the storage chamber 27 is returned to the fuel tank 2 through the return system 9. In the drawing, an arrow L4 represents a flow of the storage fuel which passes through the check valve 28.

The buoyancy of the float valve 25 is set up so as to offer the valve mechanism 6 which prevents leak of the fuel from the fuel tank 2 to the vapor fuel processing unit 4. Furthermore, the valve mechanism 6 has a coiled spring 29 for adjusting the operational characteristic of the float valve 25. The coiled spring 29 pushes the float valve 25 in the valve closing direction. The float valve 25 is in the valve open state, when fuel has not reached to the collector unit 20, such that the exhaust system 5 is made in the communication state. When fuel reaches the collector unit 20, the float valve 25 floats in the fuel, and is seated on the fixed valve seat 21a, such that the exhaust system 5 is set in the interception state.

Returning to FIG. 1, the fuel tank system 1 has the circulation system 8. The circulation system 8 is provided by a passage. The circulation system 8 is also called as a circulation passage. The circulation system 8 circulates gas between the inside of the fuel tank 2 and the adjacency of the inlet end 3a of the filler pipe 3. The circulation system 8 makes the upper part 2a of the fuel tank 2 and an inlet inside 3c near the inlet end 3a of the filler pipe 3 to communicate with each other. The circulation system 8 returns the gas from the fuel tank 2 to the inlet inside 3c. The circulation system 8 supplies gas involved in liquid fuel from the inside of the fuel tank 2. The circulation system 8 restricts the quantity of the vapor fuel discharged from the inlet end 3a to outside, when a refueling is conducted.

The circulation system 8 provides a low-pressure generation part. The circulation system 8 generates low pressure by the flow of the fuel refueled through the filler pipe 3 into the fuel tank 2, when the refueling is conducted into the fuel tank 2. The low pressure generated by the circulation system 8 is lower than a pressure inside the storage chamber 27. The low pressure generated by the circulation system 8 is lower than a pressure inside the fuel collector 7. The low pressure generated by the circulation system 8 acts on the outlet 28b side of the check valve 28 so that the check valve 28 is easily opened.

The circulation system 8 has a passage pipe 8b communicated with the upper part 2a, and a passage pipe 8a communicated with the inlet inside 3c. The passage pipe 8b extends out from the fuel tank 2. The passage pipe 8a extends out from the filler pipe 3. The control valve unit 30 is disposed between the passage pipe 8a and the passage pipe 8b. The control valve unit 30 provides a part of the circulation system 8.

The control valve unit 30 has a housing 31. The housing 31 is a product made of, for example, resin. The housing 31 has an inlet 32, an outlet 33, and a return inlet 34. The inlet 32 is connected to the passage pipe 8b. The inlet 32 introduces the vapor fuel supplied from the fuel tank 2 through the passage pipe 8b into the housing 31. The flow of fuel passing through the inlet 32 is shown by an arrow GF. The outlet 33 is connected to the passage pipe 8a. The outlet 33 supplies vapor fuel in the housing 31 to the inlet inside 3c. The return inlet 34 is connected to the return system 9 to be mentioned later. The return inlet 34 makes the low pressure to act on the return system 9 via the unification part 11. The return inlet 34 supplies the storage fuel from the return system 9 to the unification part 11.

The fuel tank system 1 has the unification part 11. The unification part 11 is a passage portion where the circulation system 8 and the return system 9 join with each other. The unification part 11 functions as a part of the circulation system 8, and contributes to the generation of the low pressure. The return system 9 and the circulation system 8 are connected with each other in the unification part 11. The storage fuel is returned to the fuel tank 2 via the return system 9 and the circulation system 8.

The fuel tank system 1 has a control valve 12. The control valve 12 is disposed in the circulation system 8. The control valve 12 is located between the fuel tank 2 and the unification part 11. The control valve 12 control the passage cross-section area of the circulation system 8 so that the low pressure acts on the unification part 11.

The control valve 12 changes the passage cross-section area of the circulation system 8 between a small cross-section area and a large cross-section area. The control valve 12 controls the passage cross-section area based on a difference between a pressure applied to the upstream end and a pressure applied to the downstream end of the circulation system 8. The control valve 12 provides the small cross-section area, when the pressure difference between the upstream end and the downstream end of the circulation system 8 is less than a predetermined level. When the pressure difference exceeds the predetermined level, the control valve 12 provides the large cross-section area. In other words, the control valve 12 permits a small flow rate when the pressure difference is less than the predetermined level, and permits a large flow rate when the pressure difference exceeds the predetermined level.

Figure 3:
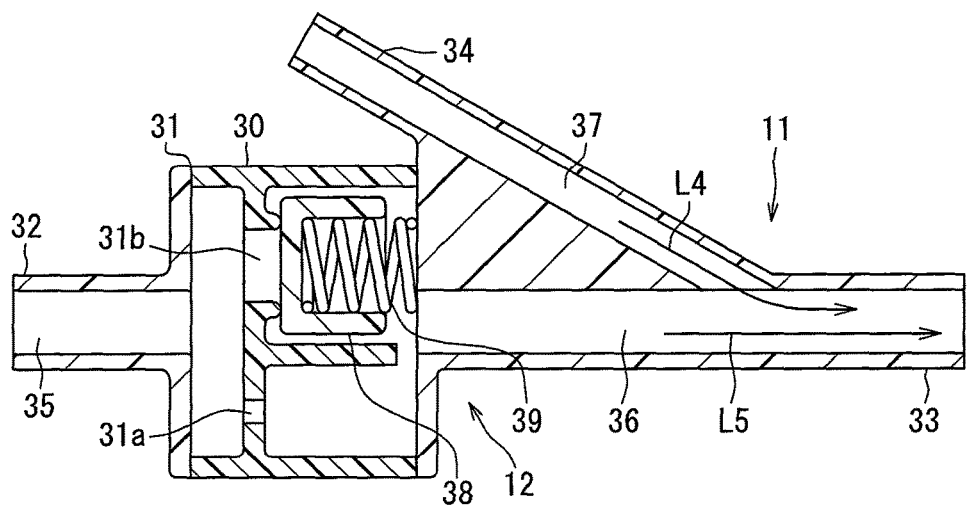
FIG. 3 is a sectional view of a control valve unit of the embodiment.

In FIG. 1 and FIG. 3, the control valve unit 30 is formed as one piping part which provides the unification part 11 and the control valve 12. The housing 31 forms an upper passage 35 communicated with the inlet 32, and a downstream passage 36 communicated with the outlet 33. The housing 31 further forms a return passage 37 which joins the downstream passage 36 in the unification part 11. The unification part 11 is located downstream of the control valve 12 in the flow direction of the circulation system 8.

The return passage 37 joins the downstream passage 36 in the unification part 11. The return passage 37 is also called as a recovering passage for collecting the storage fuel. The unification part 11 is formed so that the return passage 37 is made to join the downstream passage 36 along the flow of the vapor fuel. The return passage 37 is formed to gradually join the downstream passage 36 along a direction from the fuel tank 2 to the filler pipe 3 in the downstream passage 36. The downstream passage 36 and the return passage 37 are inclined to each other so that an acute angle is formed therebetween, and the unification part 11 corresponds to the peak of the acute angle. The return passage 37 extends from the upper side of the downstream passage 36, and joins the downstream passage 36. The unification part 11 forms a Venturi and can also be called as a Venturi part.

In the drawing, an arrow L5 represents the flow of vapor fuel in the circulation system 8. The flow L4 of the storage fuel which reaches the unification part 11 through the return system 9 flows towards the outlet 33, joining with the flow L5 of the vapor fuel in the circulation system 8.

The housing 31 has a first through hole 31a which makes the upper passage 35 and the downstream passage 36 to communicate with each other. The first through hole 31a is set up to generate the low pressure at the downstream passage 36 when the flow of vapor fuel in the circulation system 8 is less than a predetermined threshold value. The housing 31 has a second through hole 31b which makes the upper passage 35 and the downstream passage 36 to communicate with each other. The second through hole 31b is set up to generate the low pressure at the downstream passage 36 when the flow rate of vapor fuel in the circulation system 8 exceeds the predetermined threshold value. The first through hole 31a is smaller than the second through hole 31b. The first through hole 31a is always open. The second through hole 31b is a variable passage opened and closed by the control valve 12.

The control valve unit 30 has a movable valve object 38 which provides the control valve 12. The movable valve object 38 is housed in the housing 31.

The movable valve object 38 works with a fixed valve seat formed around the second through hole 31b. The control valve 12 has a coiled spring 39 for adjusting the operational characteristic of the movable valve object 38. The coiled spring 39 is arranged in the compression state between the movable valve object 38 and the housing 31. The coiled spring 39 pushes the movable valve object 38 in the valve closing direction. The movable valve object 38 is seated on the fixed valve seat to make the second through hole 31b in the communication state. The movable valve object 38 is separated from the fixed valve seat to make the second through hole 31b in the interception state. The movable valve object 38 moves in response to a difference between a pressure acting on the upstream and a pressure acting on the downstream of the valve object, i.e., in the move direction. The movable valve object 38 is switched between the valve open state and the valve closed state by responding to the pressure difference between the upstream and the downstream of the valve object.

When the movable valve object 38 makes the second through hole 31b in the interception state, the flow rate of the vapor fuel flowing through the circulation system 8 is restricted by the first through hole 31a. As a result, the flow rate of the vapor fuel flowing through the circulation system 8 is restricted, and sufficiently low pressure acts on the unification part 11. When the low pressure generated by the fuel flowing through the filler pipe 3 is large, a large pressure difference acts between the upstream and the downstream of the movable valve object 38. While the movable valve object 38 makes the second through hole 31b in the communication state, the flow rate of the vapor fuel flowing through the circulation system 8 becomes large. As a result, the low pressure can be made to act on the unification part 11 while permitting the circulation of a lot of vapor fuel, that is required as the circulation system 8.

Returning to FIG. 1, the fuel tank system 1 has the return system 9. The fuel collector 7 and the low-pressure generation part are communicated with each other by the return system 9. The return system 9 returns the fuel accumulated in the fuel collector 7 into the fuel tank 2 by the low pressure generated by the low-pressure generation part. The return system 9 is provided by a passage which makes the fuel collector 7 and the circulation system 8 to communicate with each other. The return system 9 has a passage pipe 9a which makes the collector unit 20 and the control valve unit 30 to communicate with each other. The passage pipe 9a is connected to the return outlet 24 and the return inlet 34. In this embodiment, a fuel return device is formed of the fuel collector 7 and the return system 9.

The low pressure in the unification part 11 acts on the check valve 28 via the return passage 37. The low pressure makes the check valve 28 to easily open. When the check valve 28 opens, the storage fuel reaches the unification part 11 via the return outlet 24, the passage pipe 9a, and the return passage 37. The storage fuel is transported to the inlet inside 3c by the flow of the vapor fuel flowing through the circulation system 8 in the unification part. Furthermore, the storage fuel is returned to the fuel tank 2 through the filler pipe 3. When sufficiently low pressure does not act on the unification part 11, the check valve 28 may not be opened.

On the other hand, when the storage fuel is sufficiently accumulated in the storage chamber 27, the check valve 28 may be opened by the weight of storage fuel. In this case, the storage fuel reaches the unification part 11 via the return outlet 24, the passage pipe 9a, and the return passage 37. The storage fuel is made to flow in the circulation system 8 due to the gravity, and is returned to the fuel tank 2. For example, the storage fuel can return to the fuel tank 2 by flowing backwards in the circulation system 8 through the control valve 12 from the unification part 11.

According to the embodiment, the return system 9 returns the storage fuel stored out of the fuel tank 2 to the fuel tank 2. The return system 9 returns the storage fuel to the fuel tank 2 by the low pressure generated by the circulation system 8 which is a low-pressure generation part. The low-pressure generation part generates the low pressure by the flow of fuel refueled through the filler pipe 3 into the fuel tank 2. Therefore, the storage fuel can be returned into the fuel tank 2, without being dependent on an electric pump. Further, the storage fuel can be returned to the fuel tank 2 during a refueling period. Therefore, even if fuel is included in gas discharged from the fuel tank 2 during the refueling period, the fuel collector 7 can continue the collection and the storage of fuel.

The disclosure in this description is not restricted to the illustrated embodiment. The disclosure includes the illustrated embodiments and modifications by a person skilled in the art based on the illustrated embodiments. For example, disclosure is not limited to the component and/or the combination of the components shown in the embodiments. The disclosure can be carried out with various combinations. The disclosure may use additional parts which can be added to the embodiments. The disclosure may contain modifications in which component and/or element of the embodiments are removed. The disclosure may contain modifications in which component and/or element of the embodiments are exchanged or combined. Technical scope of disclosure is not limited to the embodiments. It should be understood that some disclosed technical scope may be shown by description in the scope of claim, and contain all modifications which are equivalent to and within description of the scope of claim.

In the embodiment, the valve mechanism 6 and the fuel collector 7 are arranged in the one collector unit 20. Alternatively, the valve mechanism 6 and the fuel collector 7 may be formed as separate components. In the embodiment, the fuel collector 7 is formed immediately downstream of the valve mechanism 6 in the exhaust system 5. Alternatively, the fuel collector 7 may be formed in various positions in the fuel tank system 1. For example, the fuel collector 7 may be located immediately upstream of the vapor fuel processing unit 4. Moreover, the fuel collector 7 may be formed in the middle of piping.

In the embodiment, the control valve 12 is disposed in the circulation system 8. Alternatively, the circulation system 8 may be equipped with a fixed orifice, instead of the control valve 12. The low-pressure generation part is offered by the circulation system 8 in the embodiment. Alternatively, the low-pressure generation part may have the other various configurations. For example, the low-pressure generation part may be offered by a Venturi provided in the filler pipe 3. Moreover, in the embodiment, the unification part 11 is formed in the control valve unit 30. Alternatively, the unification part 11 and the control valve 12 may be formed as another piping parts.

Moreover, the low pressure may be generated using a flow of vapor fuel and/or fuel in a breather system, instead of the circulation system 8. Moreover, a passage equipped with the function as the circulation system 8 and the function as the breather system may be used. In many cases, a fueling nozzle inserted in the filler pipe 3 is equipped with an automatic shutoff which stops the refueling by detecting fuel. The breather system is a passage for operating the automatic shutoff, when the liquid surface of fuel in the fuel tank 2 exceeds a predetermined level, by making fuel to flow to the inlet inside 3c.

In the embodiment, the check valve 28 is provided by a duckbill valve. Alternatively, a check valve which has a movable valve object and a spring which biases the movable valve object in the valve closing direction may be used as the check valve 28. In the embodiment, the check valve 28 is disposed in the collector unit. Alternatively, the check valve may be located in arbitrary positions in the return system 9. For example, the check valve may be arranged in the control valve unit 30. For example, the check valve may be disposed immediately upstream of the unification part 11. Moreover, the check valve 28 may be understood as an element belonging to the fuel collector 7.

In the embodiment, the upward extension pipe 5a and the passage pipes 8a, 8b, and 9a are provided plural pipings independent from each other. Alternatively, the plural pipes may be partially or entirely united with other component or piping. For example, the upward extension pipe 5a and the passage pipe 9a may be bundled partially. Moreover, the collector unit 20 and the control valve unit 30 may be formed as one piping part.

What is claimed is:

1. A fuel return device comprising:
   a fuel collector located in a passage between a fuel tank and a vapor fuel processing device that processes vapor fuel discharged from the fuel tank, the fuel collector collecting fuel and storing the collected fuel as a storage fuel; and
   a return system extending from the fuel collector to return the storage fuel to the fuel tank, the return system being connected to a low-pressure generation part that generates a low pressure by a flow of fuel refueled through a filler pipe into the fuel tank, wherein
   the low-pressure generation part is a circulation system which causes the fuel tank and the filler pipe to communicate with each other,
   the return system and the circulation system are connected with each other in a unification part, and the storage fuel is returned to the fuel tank via the return system and the circulation system, and
   the circulation system has a control valve located between the fuel tank and the unification part to control a passage cross-section area so that the low pressure acts on the unification part.

2. The fuel return device according to claim 1 comprises one piping part that provides the unification part and the control valve.

3. The fuel return device according to claim 1, wherein the fuel collector is positioned to separate from the fuel tank.

4. The fuel return device according to claim 1, wherein
   the fuel collector includes a valve mechanism that prevents leak of fuel from the fuel tank to the vapor fuel processing unit, and
   the fuel collector is formed to collect fuel between the valve mechanism and the vapor fuel processing unit.

5. The fuel return device according to claim 1, wherein
   the return system has a check valve that allows fuel to flow in a forward direction toward the fuel tank, and that prevents fuel from flowing in an opposite direction from the fuel tank.

6. The fuel return device according to claim 5, wherein
   the check valve responds to a pressure difference, and is opened when a pressure adjacent to the fuel collector is higher than a pressure adjacent to the low-pressure generation part by a predetermined threshold pressure difference.

7. The fuel return device according to claim 6, wherein
   the check valve is a duckbill valve having an inlet adjacent to the fuel collector, and having an outlet adjacent to the low-pressure generation part.

* * * * *